United States Patent
Wang et al.

(10) Patent No.: US 12,298,515 B2
(45) Date of Patent: May 13, 2025

(54) HEAD-MOUNTED DISPLAY, CONTENT LOADING METHOD, AND NON-TRANSITORY COMPUTER READABLE STORAGE MEDIUM THEREOF

(71) Applicant: HTC Corporation, Taoyuan (TW)

(72) Inventors: Ying-Jing Wang, Taoyuan (TW); Fang-Ju Lin, Taoyuan (TW); Yun-Jung Lee, Taoyuan (TW); Yu-Chien Huang, Taoyuan (TW); Kuan-Yi Lien, Taoyuan (TW); Meng Ru Yang, Taoyuan (TW); Jing-Lung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 86 days.

(21) Appl. No.: 18/312,597

(22) Filed: May 5, 2023

(65) Prior Publication Data

US 2024/0027770 A1 Jan. 25, 2024

Related U.S. Application Data

(60) Provisional application No. 63/368,884, filed on Jul. 20, 2022.

(51) Int. Cl.
*G02B 27/01* (2006.01)

(52) U.S. Cl.
CPC .... *G02B 27/0172* (2013.01); *G02B 2027/014* (2013.01)

(58) Field of Classification Search
CPC ............ G02B 2027/014; G02B 27/0172
See application file for complete search history.

(56) References Cited

U.S. PATENT DOCUMENTS

| | | | | |
|---|---|---|---|---|
| 2006/0127037 A1* | 6/2006 | Van Hoff | ........... | H04N 21/4314 386/250 |
| 2008/0314232 A1* | 12/2008 | Hansson | ............... | G11B 27/038 84/625 |
| 2011/0041059 A1* | 2/2011 | Amarasingham | .... | G11B 27/034 715/716 |

(Continued)

FOREIGN PATENT DOCUMENTS

| TW | 201604587 A | 2/2016 |
|---|---|---|
| TW | 201834446 A | 9/2018 |

(Continued)

OTHER PUBLICATIONS

The office action of the corresponding Taiwanese application No. TW112126961 issued on Feb. 19, 2024.

*Primary Examiner* — Dmitriy Bolotin
(74) *Attorney, Agent, or Firm* — CKC & Partners Co., LLC

(57) ABSTRACT

A head-mounted display, content loading method, and non-transitory computer readable storage medium thereof are provided. The head-mounted display selects a first multimedia content from a plurality of multimedia contents in response to receiving a switching signal, and the switching signal is generated based on determining that a user chooses to execute a new application program, and a playing content of the first multimedia content corresponds to the new application program. The head-mounted display transmits the first multimedia content to a display to play the first multimedia content on a plurality of pixels of a display screen.

20 Claims, 5 Drawing Sheets

(56) References Cited

U.S. PATENT DOCUMENTS

| | | | |
|---|---|---|---|
| 2015/0119142 A1* | 4/2015 | Abbott | A63F 13/86 |
| | | | 463/31 |
| 2017/0315608 A1* | 11/2017 | Shanware | G06F 3/0346 |
| 2018/0190017 A1* | 7/2018 | Mendez | G06T 17/20 |
| 2018/0366068 A1 | 12/2018 | Liu et al. | |
| 2020/0241732 A1* | 7/2020 | Lu | G06F 3/04842 |
| 2022/0131963 A1 | 4/2022 | Hoellwarth | |
| 2023/0178000 A1* | 6/2023 | Goetz | G09G 5/18 |
| | | | 345/204 |

FOREIGN PATENT DOCUMENTS

| | | |
|---|---|---|
| TW | 202143698 A | 11/2021 |
| TW | 202219886 A | 5/2022 |

\* cited by examiner

HEAD-MOUNTED DISPLAY, CONTENT LOADING METHOD, AND NON-TRANSITORY COMPUTER READABLE STORAGE MEDIUM THEREOF

CROSS-REFERENCE TO RELATED APPLICATION

This application claims priority to U.S. Provisional Application Ser. No. 63/368,884, filed Jul. 20, 2022, which is herein incorporated by reference in its entirety.

BACKGROUND

Field of Invention

The present invention relates to a head-mounted display, content loading method, and non-transitory computer readable storage medium thereof. More particularly, the present invention relates to a head-mounted display, content loading method, and non-transitory computer readable storage medium thereof capable of loading corresponding display contents.

Description of Related Art

In recent years, various technologies related to virtual reality have developed rapidly, and various technologies and applications of head-mounted displays have been proposed one after another.

However, in the situation that the user wears the head-mounted display, when the user chooses to execute a new application program, the head-mounted display usually needs a long period of time to complete the loading since there may be a huge amount of data that the new application needs to load. Accordingly, the user needs to wait for a long time without interaction, resulting in a bad operating experience for the user.

Accordingly, there is an urgent need for a content loading technology that can load corresponding display content.

SUMMARY

An objective of the present disclosure is to provide a head-mounted display. The head-mounted display comprises a display and a processor, and the processor is electrically connected to the display. The display comprises a display screen with a plurality of pixels, and the display screen displays a playing content to a user through the pixels. The processor receives a switching signal, and the switching signal is generated based on determining that the user chooses to execute a new application program. The processor selects a first multimedia content from a plurality of multimedia contents in response to receiving the switching signal, and the playing content of the first multimedia content corresponds to the new application program. The processor transmits the first multimedia content to the display to play the first multimedia content on the pixels of the display screen.

Another objective of the present disclosure is to provide a content loading method, which is adapted for use in an electronic apparatus. The electronic apparatus comprises a display and a processor. The display comprises a display screen with a plurality of pixels, and the display screen displays a playing content to a user through the pixels. The content loading method comprises following steps: selecting a first multimedia content from a plurality of multimedia contents in response to receiving a switching signal, wherein the switching signal is generated based on determining that the user chooses to execute a new application program, and the playing content of the first multimedia content corresponds to the new application program; and transmitting the first multimedia content to the display to play the first multimedia content on the pixels of the display screen.

A further objective of the present disclosure is to provide a non-transitory computer readable storage medium having a computer program stored therein. The computer program comprises a plurality of codes, the computer program executes a content loading method after being loaded into an electronic computing apparatus. The electronic apparatus comprises a display and a processor. The display comprises a display screen with a plurality of pixels, and the display screen displays a playing content to a user through the pixels. The content loading method comprises following steps: selecting a first multimedia content from a plurality of multimedia contents in response to receiving a switching signal, wherein the switching signal is generated based on determining that the user chooses to execute a new application program, and the playing content of the first multimedia content corresponds to the new application program; and transmitting the first multimedia content to the display to play the first multimedia content on the pixels of the display screen.

According to the above descriptions, the content loading technology (at least including the head-mounted display, the method, and the non-transitory computer readable storage medium) provided by the present disclosure determines whether there is a switching signal generated by the user selecting to execute a new application program, and selects the first multimedia content related to the new application program from the plurality of multimedia contents in response to receiving the switch signal. The content loading technology provided by the present disclosure transmits the first multimedia content to the display to play the first multimedia content on the pixels of the display screen. The content loading technology provided by the present disclosure may load the corresponding display content on the head-mounted display at an appropriate time, thus solving the bad operation experience of the user due to a long waiting time (e.g., the long-time blank period of the display screen) caused by a huge amount of data that needs to be loaded by the new application program in the prior art.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a content loading apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
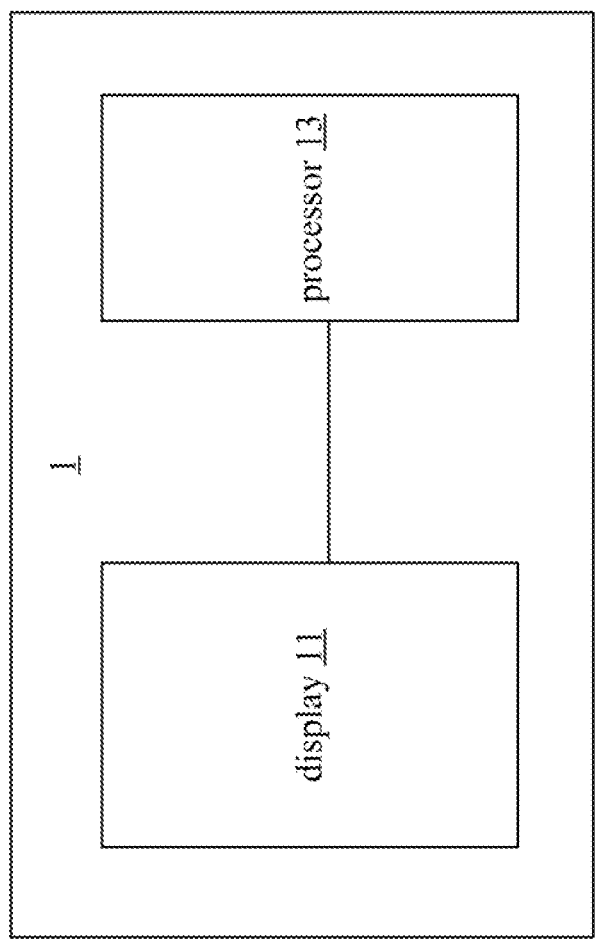
FIG. 1 is a schematic view depicting a structure a head-mounted display of the first embodiment.

A first embodiment of the present disclosure is a head-mounted display 1 and a schematic view of which is depicted in FIG. 1. The head-mounted display 1 comprises the display 11 and the processor 13, and the processor 13 is electrically connected to the display 11. The display 11 can be any device having an image display function. The processor 13 may be any of various processors, Central Processing Units (CPUs), microprocessors, digital signal processors or other computing apparatuses known to those of ordinary skill in the art.

It shall be appreciated that in the application environment of the present disclosure, a user may wear the head-mounted display 1 and operate the head-mounted display 1 (e.g., selecting an application program) through various control methods (e.g., the hand-held controller, the gesture sensing method).

Figure 2:
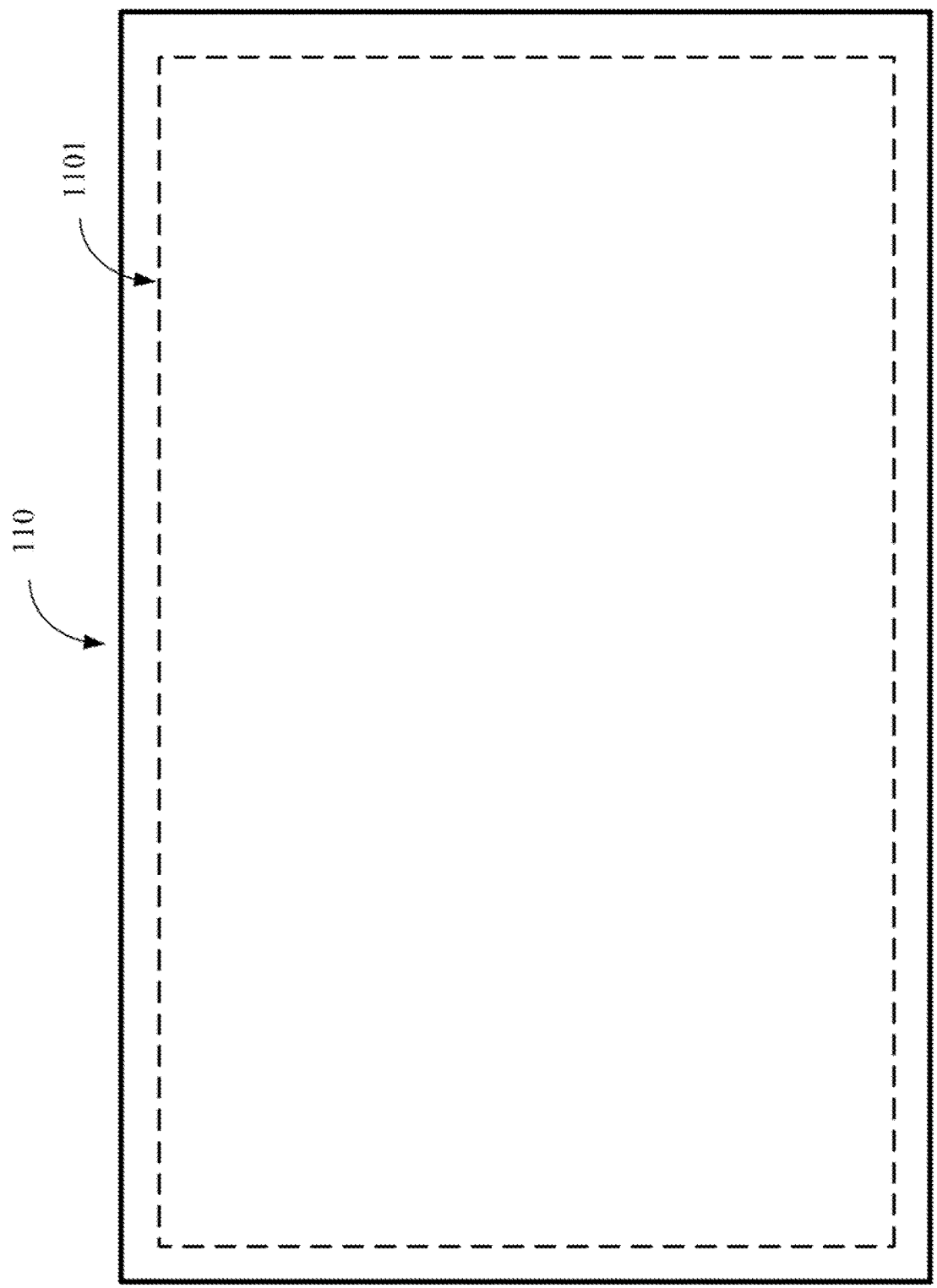
FIG. 2 is a schematic view depicting an display screen of some embodiments.

In the present embodiment, as shown in FIG. 2, the display 11 of the head-mounted display 1 comprises a display screen 110 with a plurality of pixels, wherein the display screen 110 displays a playing content to a user through the pixels (e.g., the pixels in the area 1101).

In the present embodiment, when the user chooses to execute a new application program (e.g., switching from the application program to the next application program), the head-mounted display 1 may select suitable multimedia content to play in response to the switching operation.

Specifically, the processor 13 receives a switching signal, and the switching signal is generated based on determining that the user chooses to execute a new application program. For example, the switching signal can be generated by the handheld controller and sent to the processor 13 when the user selects an application program through the handheld controller. For another example, when the user selects an application program through a gesture, the processor 13 determines that the gesture corresponds to a switching operation, and then generates the switching signal.

Next, the processor 13 selects a first multimedia content from a plurality of multimedia contents in response to receiving the switching signal, and the playing content of the first multimedia content corresponds to the new application program.

It shall be appreciated that each of the multimedia contents can be provided by the developer of the new application program (e.g. various images and animations corresponding to the new application program, etc.), and each of the multimedia contents may correspond to a subject.

In some embodiments, the multimedia content and the content of the new application program referred to in the present disclosure are two independent contents, and the size of the file data corresponding to the multimedia content is smaller than the size of the file data corresponding to the content of the new application program. Specifically, the multimedia content referred to in the present disclosure is not part of the new application program streaming.

In some embodiments, the multimedia contents correspond to a plurality of multimedia categories. For example, the multimedia categories comprise one of an image category, a two-dimensional animation category, a three-dimensional animation category, a panoramic animation category, a virtual reality object interactive image category, or a combination thereof.

For example, the panoramic animation category may allow the user to rotate and move the head-mounted display 1 to watch the animation from different viewing angles, and the virtual reality object interactive image category can interact with the user through objects in the virtual reality.

In some embodiments, the multimedia content can be pre-stored in a storage (not shown) in the head-mounted display 1, or obtained by the head-mounted display 1 from an external cloud server in real-time.

In some embodiments, in order to prevent the loading content selected by the processor 13 from increasing a large amount of computational burden, the processor 13 may evaluate the media content suitable for the current computing resource. Specifically, the processor 13 determines a computing resource corresponding to the head-mounted display 1. Next, the processor 13 selects the first multimedia content from the multimedia contents based on the computing resource.

Next, the processor 13 transmits the first multimedia content to the display 11 to play the first multimedia content on the pixels of the display screen 110.

In addition, when the new application program is fully loaded (i.e., the new application program is ready to play), the head-mounted display 1 may actively stop playing the first multimedia content (or manually stopped by the user), and switch to execute the new application program and play the content of the new application program (i.e., the content of the new application program is different from the first multimedia content).

It shall be appreciated that since the file data amount of the first multimedia content is relatively small, the head-mounted display 1 can quickly complete loading and execution. Accordingly, the problem that the user needs to wait for a long time without interaction caused by loading a new application program with a large amount of data is solved.

Figure 3:
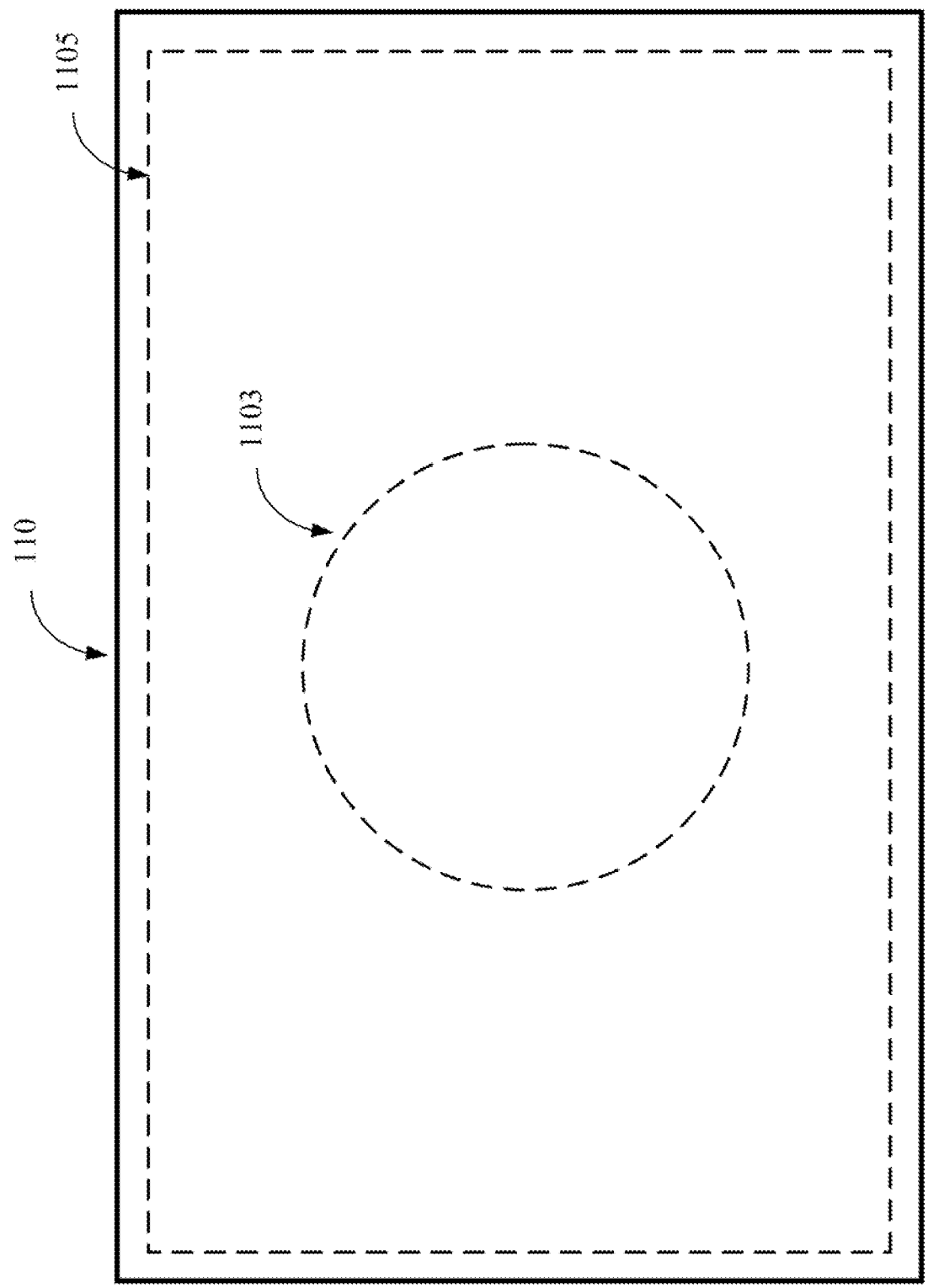
FIG. 3 is a schematic view depicting an display screen of some embodiments.

In some embodiments, the display screen 110 may further comprise a plurality of areas, and the pixels in different areas play different multimedia content respectively. Taking the two areas as an example, as shown in FIG. 3, the display screen 110 further comprises the pixels corresponding to the middle area 1103 and the pixels corresponding to the peripheral area 1105, and the peripheral area 1105 is an outlying area surrounding the middle area 1103.

In the present example, the processor 13 transmits the first multimedia content to the middle area 1103 of the display screen 110 to play the first multimedia content on the pixels corresponding to the middle area 1103 of the display screen 110.

In addition, the processor 13 selects a second multimedia content from the multimedia contents in response to receiving the switching signal, wherein the playing content of the second multimedia content corresponds to the new application program. In the present example, the processor 13 transmits the second multimedia content to the peripheral area 1105 of the display screen 110 to play the second multimedia content on the pixels corresponding to the peripheral area 1105 of the display screen 110.

In some embodiments, the first multimedia content played corresponding to the pixels in the middle area 1103 corresponds to an image category, and the second multimedia content played corresponding to the pixels in the peripheral area 1105 corresponds to a panoramic animation category.

For example, the pixels in the middle area 1103 can play a video game trademark pattern corresponding to the video game, while the peripheral area 1105 plays the panoramic animation in the video game (i.e., the user can change the viewing angle by rotating or moving the head-mounted display 1).

In some embodiments, the first multimedia content played corresponding to the pixels in the middle area 1103 corresponds to an image category, and the second multimedia content played corresponding to the pixels in the peripheral area 1105 corresponds to a virtual reality object interactive image category (i.e., the user can perform interact operations such as talking and playing games with objects in the virtual reality).

Figure 4:
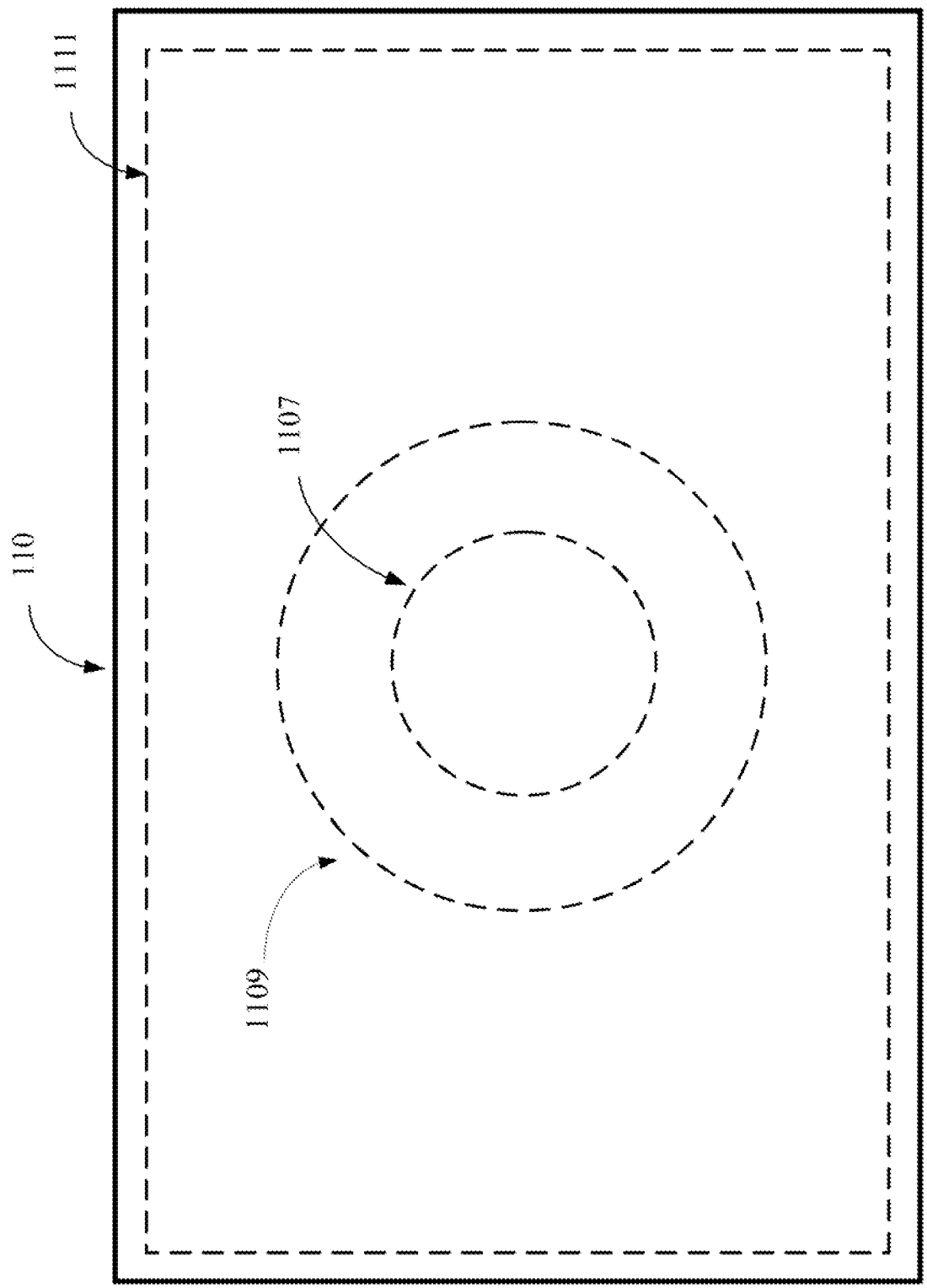
FIG. 4 is a schematic view depicting an display screen of some embodiments.

Taking three areas as an example, as shown in FIG. 4, the display screen 110 further comprises the pixels corresponding to the first area 1107, the pixels corresponding to the second area 1109, and the pixels corresponding to the third area 1111. The third area 1111 is an outlying area surrounding the second area 1109, and the second area 1109 is an outlying area surrounding the first area 1107. In the present example, the first area 1107, the second area 1109 and the third area 1111 can respectively play different multimedia contents based on the aforementioned operations.

It shall be appreciated that FIG. 3 and FIG. 4 are only used as examples, and the present disclosure does not limit the shape of the middle area and the peripheral area, and those skilled in the art should be able to understand the implementations of different shapes based on the above descriptions.

In some implementations, the processor 13 may further determine the hardware capability of the head-mounted display 1, so as to select suitable multimedia content to play. Specifically, the processor 13 classifies the multimedia contents into the multimedia categories. Next, the processor 13 determines, based on a plurality of hardware capability levels, the head-mounted display corresponds to a first hardware capability level among the hardware capability levels. Next, the processor 13 selects a first multimedia category corresponding to the first hardware capability level. Finally, the processor 13 selects the first multimedia content from the multimedia contents based on the first multimedia category.

In some embodiments, when the system loading is too high or the transmission of image data is delayed, the processor 13 can adjust the multimedia content to be played. Specifically, the processor 13 determines whether a system loading value corresponding to the head-mounted display 1 is greater than a preset value. Next, the processor 13 adjusts the first multimedia content based on a compensation operation in response to determining that the system loading value corresponding to the head-mounted display 1 is greater than the preset value.

Specifically, the compensation operation comprises one of a frame rate adjustment (e.g., reducing the number of video frames of the multimedia content), an image quality adjustment (e.g., reducing the image quality of the multimedia content), a fade-in effect (e.g., adding a fade-in effect to the multimedia content), a fade-out effect (e.g., adding a fade-out effect to the multimedia content), or a combination thereof.

In some embodiments, the processor 13 may generate corresponding multimedia content for different areas of the display screen 110 based on different special effect operations (e.g., rendering).

According to the above descriptions, the head-mounted display 1 provided by the present disclosure determines whether there is a switching signal generated by the user selecting to execute a new application program, and selects the first multimedia content related to the new application program from the plurality of multimedia contents in response to receiving the switch signal. The head-mounted display 1 provided by the present disclosure transmits the first multimedia content to the display to play the first multimedia content on the pixels of the display screen. The head-mounted display 1 provided by the present disclosure may load the corresponding display content on the head-mounted display at an appropriate time, thus solving the bad operation experience of the user due to a long waiting time (e.g., the long-time blank period of the display screen) caused by a huge amount of data that needs to be loaded by the new application program in the prior art.

Figure 5:
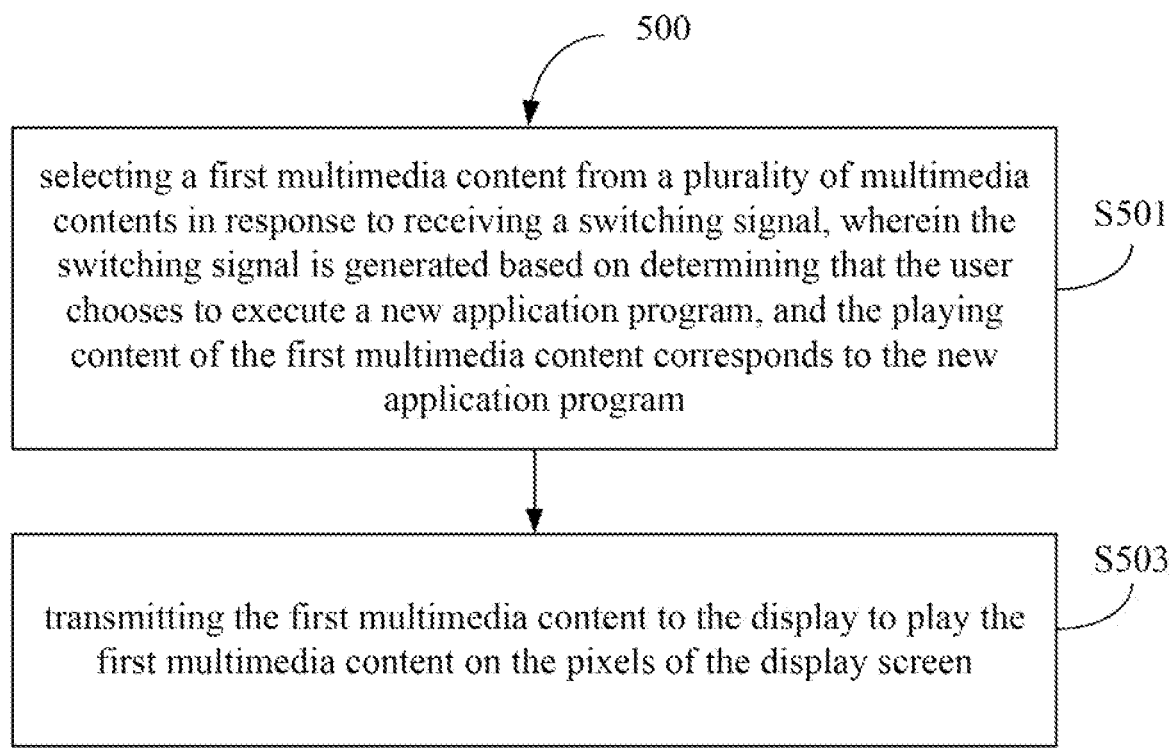
FIG. 5 is a partial flowchart depicting a content loading method of the second embodiment.

A second embodiment of the present disclosure is a content loading method and a flowchart thereof is depicted in FIG. 5. The content loading method 500 is adapted for an electronic apparatus (e.g., the head-mounted display 1 of the first embodiment). The electronic apparatus comprises a display and a processor (e.g., the display 11 and the processor 13 of the first embodiment). The display comprises a display screen with a plurality of pixels, and the display screen displays a playing content to a user through the pixels. The content loading method 500 transmits the multimedia content to the display to play the multimedia content on the pixels of the display screen through steps S501 to S503.

In the step S501, the electronic apparatus selects a first multimedia content from a plurality of multimedia contents in response to receiving a switching signal, wherein the switching signal is generated based on determining that the user chooses to execute a new application program, and the playing content of the first multimedia content corresponds to the new application program.

Next, in the step S503, the electronic apparatus transmits the first multimedia content to the display to play the first multimedia content on the pixels of the display screen of the display.

In addition, when the new application program is fully loaded (i.e., the new application program is ready to play), the electronic apparatus may actively stop playing the first multimedia content (or manually stopped by the user), and switch to execute the new application program and play the content of the new application program (i.e., the content of the new application program is different from the first multimedia content).

It shall be appreciated that since the file data amount of the first multimedia content is relatively small, the electronic apparatus (e.g., the head-mounted display 1 of the first embodiment) can quickly complete loading and execution. Accordingly, the problem that the user needs to wait for a long time without interaction caused by loading a new application program with a large amount of data is solved.

In some embodiments, the content loading method 500 further comprises following steps: determining a computing resource corresponding to the electronic apparatus; and selecting the first multimedia content from the multimedia contents based on the computing resource.

In some embodiments, the display screen further comprises the pixels corresponding to a middle area and the pixels corresponding to a peripheral area, and the peripheral area is an outlying area surrounding the middle area.

In some embodiments, the content loading method 500 further comprises following steps: transmitting the first multimedia content to the middle area of the display screen to play the first multimedia content on the pixels corresponding to the middle area of the display screen.

In some embodiments, the content loading method 500 further comprises following steps: selecting a second multimedia content from the multimedia contents in response to receiving the switching signal, wherein the playing content of the second multimedia content corresponds to the new application program; and transmitting the second multimedia content to the peripheral area of the display screen to play the second multimedia content on the pixels corresponding to the peripheral area of the display screen.

In some embodiments, the first multimedia content played corresponding to the pixels in the middle area corresponds to an image category, and the second multimedia content played corresponding to the pixels in the peripheral area corresponds to a panoramic animation category.

In some embodiments, the multimedia contents correspond to a plurality of multimedia categories, and the multimedia categories comprise one of an image category, a two-dimensional animation category, a three-dimensional animation category, a panoramic animation category, a virtual reality object interactive image category, or a combination thereof.

In some embodiments, the content loading method 500 further comprises following steps: classifying the multimedia contents into the multimedia categories; determining, based on a plurality of hardware capability levels, the electronic apparatus corresponds to a first hardware capability level among the hardware capability levels; selecting a first multimedia category corresponding to the first hardware capability level; and selecting the first multimedia content from the multimedia contents based on the first multimedia category.

In some embodiments, the content loading method 500 further comprises following steps: determining whether a system loading value corresponding to the electronic apparatus is greater than a preset value; and adjusting the first multimedia content based on a compensation operation in response to determining that the system loading value corresponding to the electronic apparatus is greater than the preset value.

In addition to the aforesaid steps, the second embodiment can also execute all the operations and steps of the head-mounted display 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tracking method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head-mounted display 1), the computer program executes the content loading method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the multimedia content, the area, the hardware capability level, the multimedia category, etc.) are preceded by terms such as "first" and "second", and these terms of "first" and "second" are only used to distinguish these different words. For example, the "first" and "second" in the first multimedia content and the second multimedia content are only used to indicate different multimedia contents used in different operations.

According to the above descriptions, the content loading technology (at least including the head-mounted display, the method, and the non-transitory computer readable storage medium) provided by the present disclosure determines whether there is a switching signal generated by the user selecting to execute a new application program, and selects the first multimedia content related to the new application program from the plurality of multimedia contents in response to receiving the switch signal. The content loading technology provided by the present disclosure transmits the first multimedia content to the display to play the first multimedia content on the pixels of the display screen. The content loading technology provided by the present disclosure may load the corresponding display content on the head-mounted display at an appropriate time, thus solving the bad operation experience of the user due to a long waiting time (e.g., the long-time blank period of the display screen) caused by a huge amount of data that needs to be loaded by the new application program in the prior art.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
   a display, comprising a display screen with a plurality of pixels, wherein the display screen displays a playing content to a user through the pixels; and
   a processor, being electrically connected to the display, and being configured to perform operations comprising:
     receiving a switching signal, wherein the switching signal is generated based on determining that the user chooses to execute a new application program;
     selecting a first multimedia content from a plurality of multimedia contents in response to receiving the switching signal, wherein the playing content of the first multimedia content corresponds to the new application program;

transmitting the first multimedia content to the display to play the first multimedia content on the pixels of the display screen; and stopping playing the first multimedia content when the new application program is fully loaded, and then switching to execute the new application program and playing a content of the new application program, wherein the content of the new application program is different from the first multimedia content.

2. The head-mounted display of claim 1, wherein the processor is further configured to perform following operations:

determining a computing resource corresponding to the head-mounted display; and selecting the first multimedia content from the multimedia contents based on the computing resource.

3. The head-mounted display of claim 1, wherein the display screen further comprises the pixels corresponding to a middle area and the pixels corresponding to a peripheral area, and the peripheral area is an outlying area surrounding the middle area.

4. The head-mounted display of claim 3, wherein the processor is further configured to perform following operations:

transmitting the first multimedia content to the middle area of the display screen to play the first multimedia content on the pixels corresponding to the middle area of the display screen.

5. The head-mounted display of claim 4, wherein the processor is further configured to perform following operations:

selecting a second multimedia content from the multimedia contents in response to receiving the switching signal, wherein the playing content of the second multimedia content corresponds to the new application program; and transmitting the second multimedia content to the peripheral area of the display screen to play the second multimedia content on the pixels corresponding to the peripheral area of the display screen.

6. The head-mounted display of claim 5, wherein the first multimedia content played corresponding to the pixels in the middle area corresponds to an image category, and the second multimedia content played corresponding to the pixels in the peripheral area corresponds to a panoramic animation category.

7. The head-mounted display of claim 1, wherein the multimedia contents correspond to a plurality of multimedia categories, and the multimedia categories comprise one of an image category, a two-dimensional animation category, a three-dimensional animation category, a panoramic animation category, a virtual reality object interactive image category, or a combination thereof.

8. The head-mounted display of claim 7, wherein the processor is further configured to perform following operations:

classifying the multimedia contents into the multimedia categories;

determining, based on a plurality of hardware capability levels, the head-mounted display corresponds to a first hardware capability level among the hardware capability levels;

selecting a first multimedia category corresponding to the first hardware capability level; and selecting the first multimedia content from the multimedia contents based on the first multimedia category.

9. The head-mounted display of claim 1, wherein the processor is further configured to perform following operations:

determining whether a system loading value corresponding to the head-mounted display is greater than a preset value; and adjusting the first multimedia content based on a compensation operation in response to determining that the system loading value corresponding to the head-mounted display is greater than the preset value.

10. The head-mounted display of claim 9, wherein the compensation operation comprises one of a frame rate adjustment, an image quality adjustment, a fade-in effect, a fade-out effect, or a combination thereof.

11. A content loading method, being adapted for use in an electronic apparatus, wherein the electronic apparatus comprises a display and a processor, the display comprises a display screen with a plurality of pixels, the display screen displays a playing content to a user through the pixels, and the content loading method comprises:

selecting a first multimedia content from a plurality of multimedia contents in response to receiving a switching signal, wherein the switching signal is generated based on determining that the user chooses to execute a new application program, and the playing content of the first multimedia content corresponds to the new application program;

transmitting the first multimedia content to the display to play the first multimedia content on the pixels of the display screen; and stopping playing the first multimedia content when the new application program is fully loaded, and then switching to execute the new application program and playing a content of the new application program, wherein the content of the new application program is different from the first multimedia content.

12. The content loading method of claim 11, wherein the content loading method further comprises following steps:

determining a computing resource corresponding to the electronic apparatus; and selecting the first multimedia content from the multimedia contents based on the computing resource.

13. The content loading method of claim 11, wherein the display screen further comprises the pixels corresponding to a middle area and the pixels corresponding to a peripheral area, and the peripheral area is an outlying area surrounding the middle area.

14. The content loading method of claim 13, wherein the content loading method further comprises following steps:

transmitting the first multimedia content to the middle area of the display screen to play the first multimedia content on the pixels corresponding to the middle area of the display screen.

15. The content loading method of claim 14, wherein the content loading method further comprises following steps:

selecting a second multimedia content from the multimedia contents in response to receiving the switching signal, wherein the playing content of the second multimedia content corresponds to the new application program; and transmitting the second multimedia content to the peripheral area of the display screen to play the second multimedia content on the pixels corresponding to the peripheral area of the display screen.

16. The content loading method of claim 15, wherein the first multimedia content played corresponding to the pixels in the middle area corresponds to an image category, and the second multimedia content played corresponding to the pixels in the peripheral area corresponds to a panoramic animation category.

17. The content loading method of claim 11, wherein the multimedia contents correspond to a plurality of multimedia categories, and the multimedia categories comprise one of an image category, a two-dimensional animation category, a three-dimensional animation category, a panoramic animation category, a virtual reality object interactive image category, or a combination thereof.

18. The content loading method of claim 17, wherein the content loading method further comprises following steps:
classifying the multimedia contents into the multimedia categories;
determining, based on a plurality of hardware capability levels, the electronic apparatus corresponds to a first hardware capability level among the hardware capability levels;
selecting a first multimedia category corresponding to the first hardware capability level; and
selecting the first multimedia content from the multimedia contents based on the first multimedia category.

19. The content loading method of claim 11, wherein the content loading method further comprises following steps:
determining whether a system loading value corresponding to the electronic apparatus is greater than a preset value; and
adjusting the first multimedia content based on a compensation operation in response to determining that the system loading value corresponding to the electronic apparatus is greater than the preset value.

20. A non-transitory computer readable storage medium, having a computer program stored therein, wherein the computer program comprises a plurality of codes, the computer program executes a content loading method after being loaded into an electronic apparatus, the electronic apparatus comprises a display and a processor, the display comprises a display screen with a plurality of pixels, the display screen displays a playing content to a user through the pixels, the content loading method comprises:
selecting a first multimedia content from a plurality of multimedia contents in response to receiving a switching signal, wherein the switching signal is generated based on determining that the user chooses to execute a new application program, and the playing content of the first multimedia content corresponds to the new application program;
transmitting the first multimedia content to the display to play the first multimedia content on the pixels of the display screen; and
stopping playing the first multimedia content when the new application program is fully loaded, and then switching to execute the new application program and playing a content of the new application program, wherein the content of the new application program is different from the first multimedia content.

* * * * *